United States Patent [19]
Colla et al.

[11] Patent Number: 5,090,246
[45] Date of Patent: Feb. 25, 1992

[54] ELASTOMER TYPE LOW PRESSURE SENSOR

[75] Inventors: Jeannine O. Colla, Mequon; Paul E. Thoma, Cedarburg; Gary F. Oman; Carl F. Klein, both of New Berlin; Paul H. Froehling, Franklin; Scott L. Spence, Port Washington; Ivshin Yefim, Shorewood; Arthur Barootian, Racine, all of Wis.

[73] Assignee: Johnson Service Corp., Milwaukee, Wis.

[21] Appl. No.: 585,686

[22] Filed: Sep. 19, 1990

[51] Int. Cl.⁵ ............................ G01L 7/08; G01L 9/12
[52] U.S. Cl. ........................................ 73/718; 73/724; 361/283
[58] Field of Search ................... 73/718, 724; 361/283

[56] References Cited

U.S. PATENT DOCUMENTS

| | | | |
|---|---|---|---|
| 3,814,998 | 6/1974 | Thoma et al. | 73/718 |
| 3,943,915 | 3/1976 | Severson | 73/724 |
| 4,152,748 | 5/1979 | Arkans | 361/283 |
| 4,168,517 | 9/1979 | Lee | 361/283 |
| 4,177,680 | 12/1979 | Coleman | 73/718 |
| 4,852,443 | 8/1989 | Duncon et al. | 361/283 |

Primary Examiner—Donald O. Woodiel
Attorney, Agent, or Firm—Foley & Lardner

[57] ABSTRACT

A capacitance elastomeric pressure sensor includes top and bottom mounting plates arranged to support a pair of electrode layers. The first electrode layer is supported on the upper surface of a dielectric disc held by an upper mounting plate. The second electrode layer is located beneath the disc and includes a conductive elastomeric layer overlying an elastomeric support layer. In the preferred embodiment, the elastomer is a silicone elastomer and the conductive layer is formed by admixing a conductive carbon powder with the silicone. The sensor is particularly effective in sensing pressure changes in this low range, e.g. 0-1 inch of water. In the most preferred embodiment the elastomeric layer is prestrained for temperature compensation.

29 Claims, 3 Drawing Sheets

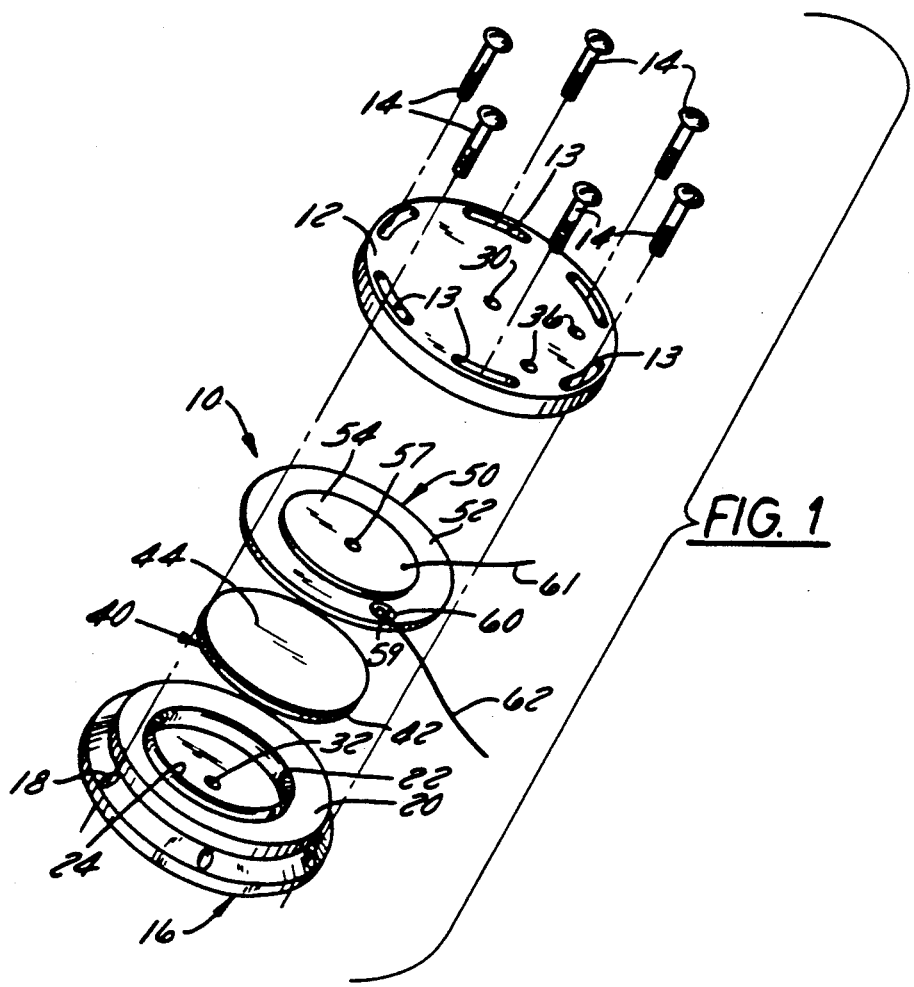
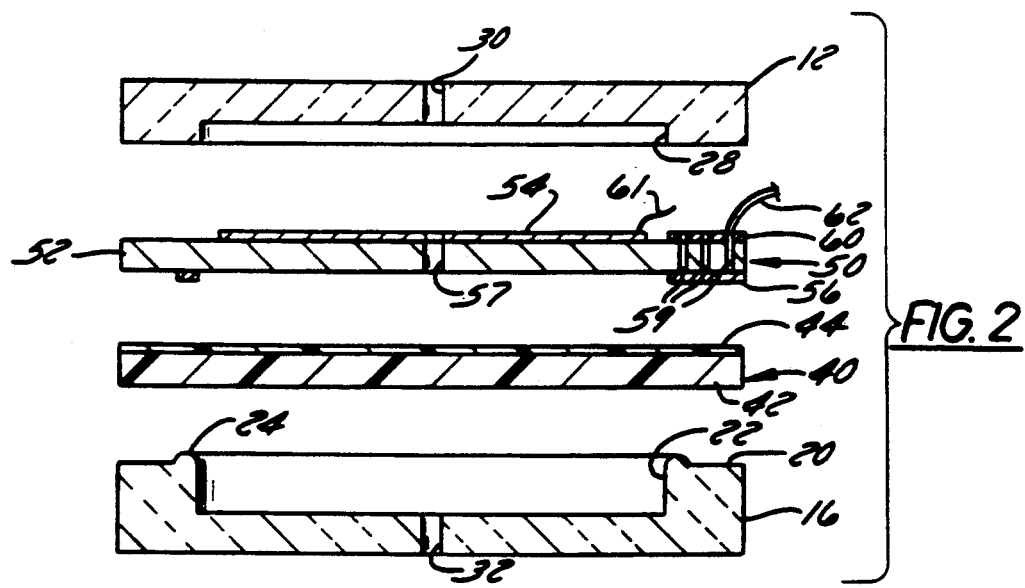

ELASTOMER TYPE LOW PRESSURE SENSOR

BACKGROUND OF THE INVENTION

1. Field of the Invention

The present invention relates generally to pressure sensors, more particularly to those used for accurate readings in the 0-1 inch of water range. Still more particularly, the invention relates to a relatively inexpensive and easy to fabricate pressure sensor using an elastomer laminate electrode, a rigid dielectric supported electrode and a pair of covers, which in the most preferred embodiment provide prestraining of the elastomer electrode to decrease temperature sensitivity, thereby enhancing system accuracy.

2. Description of the Prior Art

There exists in control or monitoring systems a need to detect pressure conditions in a wide variety of applications. In several systems previously described, such pressure conditions are detected by transducing to an electrical output using a mechanical movement triggered by the pressure condition. The movement effects a change in an electrical output as a result of a change in, for example, resistance, inductance, capacitance or other electrical characteristic.

Early devices employing capacitance technology generally use one of two system types. In the first, a fixed or stationary electrode formed a base for the sensing unit, and a dielectric material, which could be a fluid, was supported thereon. A conductive outer plate was movably mounted on the dielectric and was exposed to the pressure condition to cause a flex of the dielectric, with a corresponding change in the capacitance characteristic. In the second, a conductive diaphragm was movably mounted between a pair of stationary electrode plates for movement parallel to the plates and coupled with a pressure source for corresponding positioning between the two fixed plates to thereby vary the capacitance. These systems were difficult to manufacture and were easily contaminated by environmentally born dust and the like, resulting in extreme cases in shorting of the system. Any leakage of a fluid dielectric in such systems could also dramatically change the system characteristics.

An earlier system developed by the assignee of this invention is described in Thoma, et al. U.S. Pat. No. 3,814,998 issued June 4, 1974 for "Pressure Sensitive Capacitance Sensing Element". The diaphragm element includes thin outer conductive layers on either side of a core of resilient silicone or other dielectric. The conductive layers are made of the same material as the core, with conductive particles embedded therein. One layer is spaced peripherally from the edge of the core layer (to prevent electrical contact between the conducting layers) and the unit is rigidly mounted with metal contacts connected to the conducting layers (e.g. using a silver conducting paint). The element will flex to the side of lower pressure causing a change in the effective conducting area of the opposed conductive layers and a simultaneous decrease in the thickness of the dielectric inner core. As a result, the capacitance of the unit varies as a function of deflection.

In U.S. Pat. No. 3,943,915 issued Mar. 16, 1976 to Severson for "Intracranial Pressure Sensing Device", two thin metal plates serve as the plates of a capacitor, separated by an air dielectric. The plates are spaced from each other and joined together near their periphery with a polyimide ring and epoxy adhesive. The pressure differential across one of the plates causes the air space between the plates to change and results in a change in capacitance.

A "Multiple Transducer" is described in Arkans U.S. Pat. No. 4,152,748, issued May 1, 1979. In this device, the dielectric layer is made of non-conducting sponge rubber. A first plate of a capacitor is a flexible, conducting layer coextensive with the dielectric, while the second plate of the capacitor is smaller in size than the first plate and has a shape that will best define a localized stress point. There are usually multiple second plates of different size and shape in this device.

Another pressure sensing system is described in Lee U.S. Pat. No. 4,168,517 issued Sept. 18, 1979 for "Capacitive Pressure Transducer", in which the pressure transducer has a capacitor configuration. The plates of the capacitor are metal and the dielectric layer is air. This patent focuses on the use of a deep annular convolution in one of the metal capacitor plates to prevent slipping in the clamping area and the use of an elastic mounting ring to also aid in preventing slipping. The metal plate that defines the area of the capacitor is integrally bonded to a rigid ceramic which is not part of the dielectric layer of the capacitor.

Yet another sensor is disclosed in U.S. Pat. No. 4,177,680 issued Dec. 11, 1979 to Coleman for "Dual Pressure Sensor". The two halves of the sensor are identical in structure. Each sensor has one plate of the capacitor attached to a common substrate with the second plate of each capacitor being a metal diaphragm joined along its periphery to a common substrate. The two capacitors have an air dielectric therebetween, and when a change in pressure occurs across the metal diaphragm, the thickness of the air gap changes resulting in a change in capacitance for one of the capacitors.

Each of these systems has drawbacks, especially when a pressure change of a low order of magnitude is to be detected. The drawbacks include sensitivity to temperature changes, ambient temperature compensation, humidity sensitivity and a limited ability to withstand contaminants within the environment being measured Moreover, the prior devices are not suitable for pressure measurements in the low 0-1 inch of water range. These devices are also structurally complex and difficult to manufacture. Solutions to the problems associated with the prior art devices would represent significant advances in this technology.

SUMMARY OF THE INVENTION

The present invention provides a low pressure sensor which is particularly suitable for pressure measurements in the range of 0-1 inch of water. The sensor of the present invention also provides low cost and ease of fabrication, as well as relatively insignificant sensitivity to changes in temperature and humidity. It is also able to withstand contaminants within the environment being measured.

In the present invention a silicone material is preferably used as an elastomer for both a dielectric support layer and a conductive film layer of a laminated diaphragm electrode. Prestraining of the film, 8-14% in the preferred embodiment, provides a means for temperature compensation. The integrally bonded elastomer layers make up one conducting plate of a capacitor which moves toward and away from a stationary dielectric and conducting plate electrode in response to pressure changes. The conductive layer of the elastomer diaphragm is positioned to deflect away from the stationary electrode with an increase in pressure differential across the elastomer diaphragm. Increased sensitivity at low pressure is evidenced by a greater magnitude of change in capacitance at low pressure.

The preferred device shown in the drawings of the present application includes an upper mounting plate, a rigid or stationary dielectric plate with an electric contact ring on one surface and the rigid conducting plate of the capacitor on the opposite surface, a composite conductive elastomer electrode and a lower mounting plate. The uniformly strained elastomer is held securely between the mounting components by suitable fasteners. Since the capacitance of the pressure to electric transducing capacitor is controlled by the area of the stationary electrode, the thickness of the stationary dielectric plate and the space (air-gap) between the elastomeric electrode and the stationary electrode, optimum results are achieved. The capacitance of the element decreases with an increase in the distance between the elastomer electrode and the stationary electrode, occurring with increasing pressure differential across the composite conductive elastomeric diaphragm. Such differential occurs when the pressure in the air gap between the conductive elastomeric layer and the dielectric plate is greater than the pressure in the space on the opposite side of the elastomeric diaphragm. Further ways in which the structure of the present invention can provide the advantages mentioned herein and overcome the short-comings of the prior devices will become apparent to one skilled in the art after reading the specification and observing the accompanying FIGURES.

DESCRIPTION OF THE DRAWINGS

FIG. 1 is an exploded view of an elastomer type capacitance low pressure sensor system according to one embodiment of the present invention;

FIG. 2 is a side exploded view of the major components of the system shown in FIG. 1;

DETAILED DESCRIPTION OF THE PREFERRED EMBODIMENT

Figure 3:
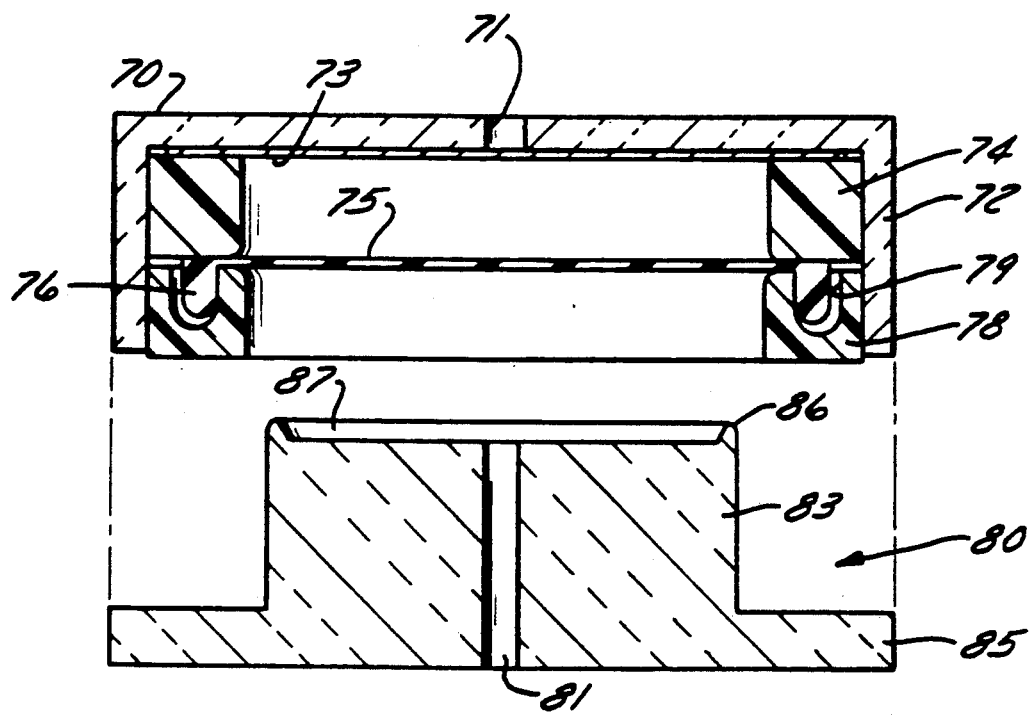
FIG. 3 is an exploded side section view of the components of the preferred low pressure sensor according to the present invention.

Referring first to FIG. 1, the pressure sensor 10 of one embodiment of the present invention is shown in a perspective, exploded format to include a generally circular top mounting plate 12 having a plurality of peripherally spaced openings 13 adapted to receive mounting screws 14 or other suitable fasteners. The lower component is a bottom mounting plate 16, also generally circular in shape and including a plurality of peripherally spaced threaded holes 18 adapted to receive screws 14. The upper surface 20 of plate 16 is generally planar, and a generally cylindrical recess 22 is formed in the upper portion of plate 16, which recess is surrounded by a raised rim 24 extending upwardly from surface 20 for a reason which will become apparent shortly. A cylindrical recess 28 is formed in upper plate 12, as well, as is shown in FIG. 2. Furthermore, one or more holes 30 are provided through upper plate 12 and one or more holes 32 are provided through lower plate 16 so that the internal components of sensor 10 which are soon to be described may be exposed to the fluid, the pressure differential of which is to be measured by the device of the present invention. Also noted in FIG. 1 are a pair of openings 36 in plate 12, which are for the wire leads from the internal components used to couple sensor 10 to the electronic conversion equipment which forms, in and of itself, no part of the present invention. In most applications, the upper plate 12 will be exposed to higher pressure, while plate 16 will preferably be exposed to lower pressure, although the opposite pressure relationship is possible.

Sandwiched between plates 12 and 16 are two additional components: an elastic electrode laminate 40 and a fixed electrode support member 50, each of which will be described in greater detail below.

The elastic laminate 40, as best shown in FIG. 2, comprises a lower elastic layer 42 and an upper elastic conductive layer 44. In its most preferred form, both of such layers are formed from a silicone polymer, with a conductive material dispersed in layer 44. Layer 44 is the flexible movable plate electrode of the capacitor of the sensor 10, while layer 42 is provided as an electrically insulating spring support for it. While varying thicknesses can be used, depending principally on sensitivity and particular application factors such as size, in the illustrated embodiment the layer 42 is about 0.0125" thick, while the thickness of layer 44 is about 0.0008". Layer 42 also provides a buffer against hysteresis due to conductive material loading of layer 44.

Silicone polymers are preferred for this application because the silicon-oxygen-silicon backbone of the polymer chains provide unique properties that distinguish these materials from organic resins. The bond linkages of the silicones are similar to those found in other high temperature resistant materials such as quartz, glass and sand, and also provide for stability against the deteriorating factors such as chemicals, ozone, radiation and weathering. The lack of double bonding makes these materials highly resistant to oxidation. They are 100% solids systems and do not require extenders or plasticizers, and they are flexible over a very large temperature range. Another desirable property of the silicones is their resiliency, yielding nearly instantaneous recovery after deflection, over a wide temperature range, with minimal creep (plastic flow).

A number of silicones are available which would be useful in the present invention, but the most preferred is General Electric's, RTV-615, which consists mainly of poly (dimethyl siloxane) chains with occasional chemical cross-links between the chains. The material remains non-crystalline and elastomeric to −40° C. and it retains its excellent thermal stability at high temperatures as well. The material is useful in demanding applications. RTV-615 is a two part curing elastomer (A and B) which cures by addition without the production of by-products. Specific chemical properties of this material include:

| Specific Gravity | 1.02 |
|---|---|
| Hardness, Shore A | 35 |
| Tensile Strength, psi | 925 |
| Elongation, % | 150 |
| Brittle Point | −75° F. |
| Elastic Modulus to 30% Elongation, psi | 275 |
| Dielectric Constant at 60 Hz | 3.0 |

| | |
|---|---|
| Dissipation Factor at 60 Hz | 0.001 |
| Volume Resistivity, Ohm-cm | $1 \times 10^{15}$ |
| Maximum Continuous Service Temperature, °F. | 400 |

The stability of these various properties with time and temperature is a synergistic property which is especially valuable here.

The compatibility of the materials used in making elastic laminate 40 is an important aspect of this invention. The solvent used to prepare layer 44 and the conductive material and silicone elastomer, which form the composite structure of layer 44, are compatible with each other and the silicone elastomer of layer 42.

The preferred conductive material for use with layer 44 is graphitized Vulcan XC-72 carbon, available from Cabot Corporation. Other Cabot products which are useful as the conductive material include partially oxidized carbon (such as Vulcan XC-72 and Black Pearls 2000) or the deoxidized forms thereof. Similar materials from other manufacturers can be substituted. The particle size for the conductive material ranges from about 10 to about 1,000 nanometers, preferably about 30 nanometers. A preferred composition for the conductive elastic layer 44 includes about 4.13 parts by weight Vulcan XC-72, 35.00 parts by weight RTV-615A silicone monomer, 4.00 parts by weight silicone reactant RTV-615B in 100.00 parts by weight of a solvent, such as methyl ethyl ketone.

Other conductive materials could be used in layer 44, such as finely divided metals (silver, gold, platinum or copper, for example). Preferably, the resin composition includes about 5.0% to about 50% of conductive filler on a weight basis. The resistance of the elastic conductive layer 44 should be less than 50,000 ohms.

Figure 5:
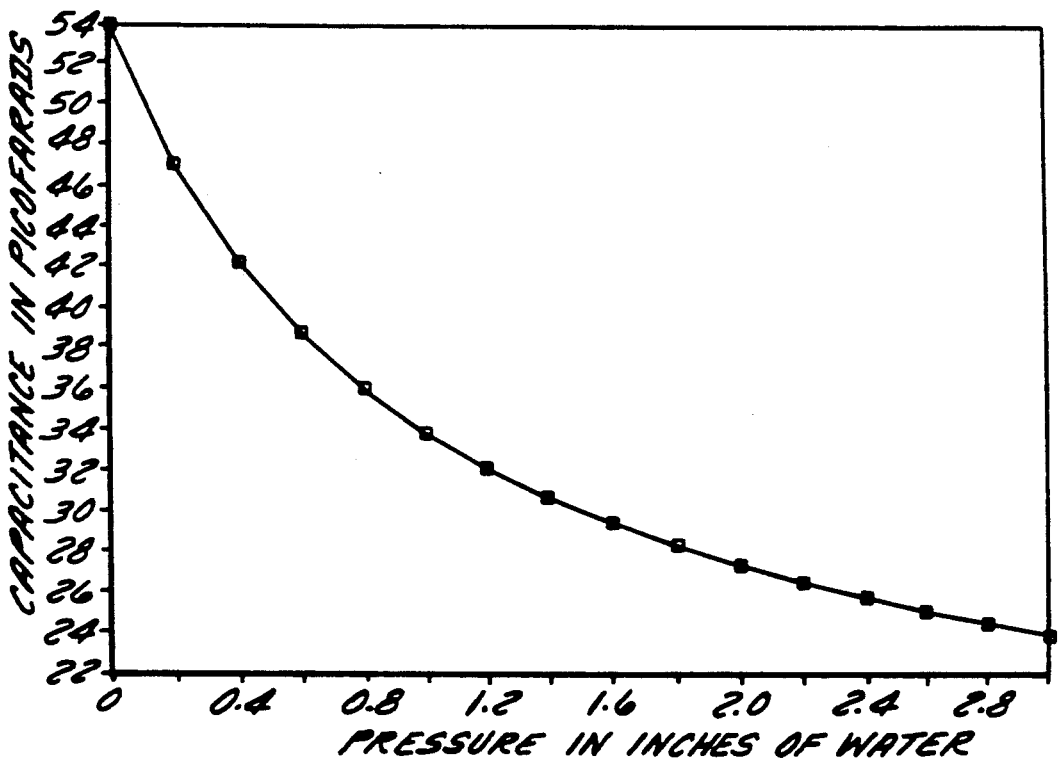
FIG. 5 is a capacitance vs. pressure graph for the sensor of the most preferred embodiment of the present invention.

In sensor 10 it is desirable to have greater sensitivity, as measured by a change in capacitance, at the lower pressure end of its range. For example, the change in capacitance from 0 to 0.5 inch of water pressure change should be equal to or more than the change in capacitance from 0.5 to 1 inch of water pressure change. In the present system, the conductive layer 44 of the laminate 40 is positioned to deflect away from the upper plate 50 with an increase in pressure differential. Increased sensitivity at lower pressure differentials is evidenced by a greater magnitude of change in capacitance at low pressures as shown in FIG. 5.

While maintaining the desired pressure sensitivity, the effect of temperature is minimized in the illustrated embodiment, by prestraining of the elastic laminate layer 40 by about 8-14% (preferably about 12%). Prestraining is accomplished by radially stretching the elastic laminate 40 over the rim 24 of bottom mounting plate 16 while the top plate is secured thereto. Other systems for accomplishing and maintaining the prestraining will appear to those skilled in the art after reading the present specification, and such other methods are deemed to fall within the scope of the invention. The preferred technique is described below in connection with the embodiment shown in FIGS. 3 and 4.

Fabrication of elastic laminate 40 can also be accomplished in a number of ways. The preferred method, however, is set forth here. The first step comprises weighing out the required quantity of carbon and mixing it with the methyl ethyl ketone and RTV-615A in a ball mill jar and rotating the jar on a ball mill for up to six (6) days. The RTV-615B is added and mixing continues for an additional several hours (up to about 16 hours) to finish the solution for layer 44. The elastic layer 42 mixture of RTV-615A and RTV-615B is prepared and thoroughly stirred.

Layer 42 is first poured onto a clean, flat glass plate, and a doctor blade with a gap setting of 0.018/inch is used to cast the elastic layer. The plate is then placed on a 60° C. heating panel for about 15 minutes, after which time the temperature is raised to 150° C. for another thirty (30) minutes. Following cooling for about thirty (30) minutes at ambient temperature, the plate is ready for application of the carbon containing solution. The gap setting of the doctor blade is set at 0.020 inch and the conductive layer 44 is cast over the elastic layer in a single motion. The elastic laminate 40 is left to stand in a hood for about thirty (30) minutes to remove the solvent, and then is processed through the same fifteen-thirty-thirty (15-30-30) curing process used for the elastic layer 42.

The next step in the fabrication process comprises cutting the diaphragms 40 to the desired shape with a sharp knife and template. A laboratory forceps is used to remove the preferably circular pieces from the glass plate.

Referring once again to FIGS. 1 and 2, the second interior component of sensor 10 comprises the fixed electrode support member 50 having three major components: a dielectric plate 52 prepared from a solid material such as alumina, a conductive electrode layer 54 on the upper surface of plate 52 and an electric contact ring 56 on the bottom of plate 52. Plate 52 should be of uniform thickness (for example, about 0.010 inch). ADS-96R alumina available from Coors Porcelain Company is a suitable material because its dielectric constant is 9.5 at 25° C. Plate 52 is typically cut from a larger board. An air passage hole 57 (about 0.062 inch diameter) is provided at the center of plate 52, while a plurality (e.g. 3) of smaller holes 59 (0.010 inch diameter) are provided near the outer rim of plate 52 and serve to transmit conductive ink through plate 52 to a small conductive circle 60 located on the upper surface of plate 52 between its edge and electrode layer 54.

Screen printing with A3O58 Silver Platinum Ink available from Engelhard Corporation is used to apply the electrode layer 54 on plate 52. Locating the electrode in this manner assures that there cannot be any electrical contact between the two electrode plates. Screen printing is also used to form the contact ring 56 on the lower surface of plate 52, the same ink material being used here. The ink is a chemically bonded thick film conductor using a "surfactive" bonding mechanism. It contains no discreet frit or oxide particles which interfere with soldering or wire bonding. Because the only solids in the ink are metal, the cured ink films have a uniformly smooth surface.

The preparation technique for the preferred electrode support member 50 begins with a 1.5" diameter alumina disc with the appropriate holes and continues with wiping of the disc with solvent to remove oils, dust or lint. The ink composition mentioned above is applied using a C. W. Price Model 8010 Thick Film Screen Printer, using a 325 mesh screen with a 0.5 mil patterned photoemulsion (stencil). After thoroughly stirring the ink, it is applied to the patterned screen and the squeegee is "buttered". The printer is cycled to print the ring shaped contact 56 on the lower surface of plate 52. The disc is then dried on a panel heater at 125° C. for ten (10) minutes. The alumina disc is then turned over, and the screening process is used to print the circular electrode layer 54 on the top surface. Drying of the fixed conductive electrode layer 54 of the capacitor is carried out at 125° C. for ten (10) minutes. The alumina disc is positioned over a ceramic washer (which fits within the contact ring) to prevent the conductive ink from contacting any surface during the subsequent firing operation.

Firing takes place in a Lindberg furnace where a firing cycle of 900° C. for ten (10) minutes is carried out for good adhesion and uniform resistivity of conductive electrode and ring. Cooling takes place in the furnace, with the door closed, until the temperature decreases to 200° C. or less. After cooling, the fixed electrode support members are inspected and stored for use.

Before final assembly of sensor 10, a pair of wire leads 61 and 62 are attached to the conductive electrode layer 54 and to the contact circle 60. Both leads eventually pass through holes 36 in top mounting plate 12.

Sensors built according to the present invention have demonstrated repeatability and hysteresis error below one percent (1%). The prestraining is a major contributing factor to compensate for temperature effects. The prestraining compensates for thermal expansion with increasing temperature, and increasing stiffness with increasing temperature.

It is desirable to achieve thermal expansion match in the other system components, and systems have been prepared using ceramic mounting plates, plastic mounting plates, steel screws, plastic screws, etc. Optimum results were achieved when a ceramic material (MACOR ®, machinable glass ceramic, a product of Corning Glass Works) was used for both plates, as compared to plastic plates or mixes of plastic with ceramic. Little difference was noted with respect to steel or plastic screws, so the plate material seems to be more critical. If only a part of the case for sensor 10 were to be ceramic, it is preferred to use it for mounting plate 12, i.e. the one used to mount the electrode support member 50.

The pressure used to compress and hold the elastomeric electrode is also believed to be important in the construction of sensor 10, and in our testing we used a total thickness of 0.013 inch for the elastic laminate 40. By compressing the elastomeric electrode to approximately one-half its thickness, where rim 24 contacts the elastomeric electrode, optimum results were achieved. The preferred range for compression would be from about 35-65 percent of the elastomeric electrode thickness. Raised rim 24 prevents the elastic laminate 40 from slipping when pressure is applied. Recess 22 accommodates the bulging of the elastic laminate 40.

Another embodiment of the invention is shown in FIG. 3 where the prestraining of the elastic laminate is accomplished by assembly of specially designed parts. In this embodiment, the top plate 70 is cup shaped and includes a central aperture 71 and a depending skirt 72. The fixed electrode 73 is similar to member 50 previously described, and an annular spacer ring 74 is provided to space an elastomeric electrode 75 from the fixed electrode 73. Elastomeric electrode 75 differs from element 40 of FIGS. 1 and 2 in that it includes a peripheral ring 76 around the lower edge thereof. This ring is prepared in the preferred embodiment by using the mixed A and B silicone components and dispensing the mixture into a recessed groove etched into a flat glass plate. After heat curing (as described previously) the plate with the molded ring therein is ready for application of the elastic layer 42 thereover as described above.

A retaining ring 78 having a groove 79 is used to contain the ring portion 76 in combination with the spacer 74. The final component is a bottom plate 80 having a central aperture 81. Plate 80 includes a central plug portion 83 extending from plate portion 85, the upper part of portion 83 terminating in a rim 86 (similar to rim 24) surrounding a chamber 87 (similar to chamber 22).

Figure 4:
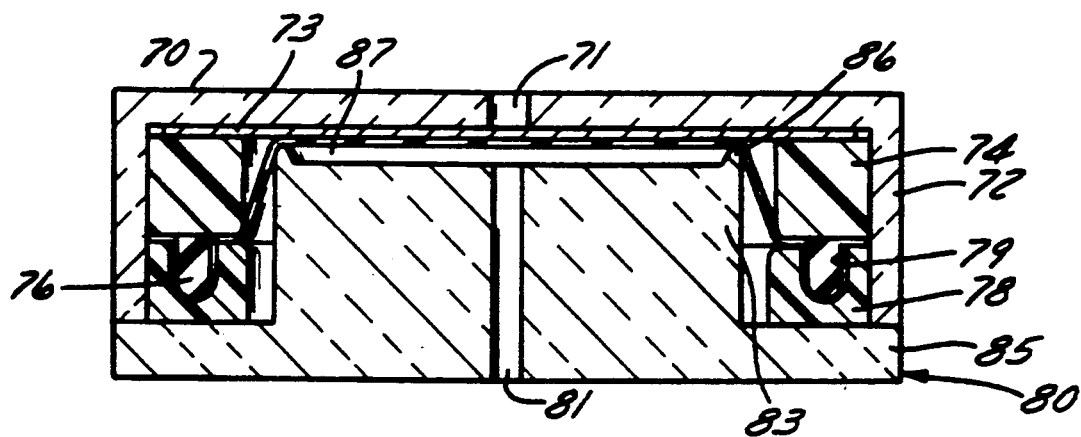
FIG. 4 is a side sectional view of the assembled components shown in FIG. 3.

As shown in FIG. 4, when the top and bottom plates, 70 and 80, are drawn together and held in place (for example by suitable fasteners or spring clips not shown), the rim 86 of the bottom plate prestrains the elastomeric electrode 75 as it approaches the bottom of the fixed electrode 73. The prestraining is continued until the elastomeric electrode touches the contact ring (not shown) of the fixed electrode 73, at which time the desired compression of the elastomeric electrode takes place, i.e. to about ½ of its thickness. Rim 86 should be rounded to permit the radial prestraining of elastomeric electrode 75 without tearing of same. The prestraining accomplished here is consistent and uniform and is preferred to fabricating techniques which physically prestrain an elastomeric electrode and attempt to hold the desired prestraining forces while clamping forces are applied between the fixed electrode and bottom plate rim.

While several structures are suggested in this specification, in many cases the materials, thicknesses, diameters and number and arrangement of the components are a matter of design choice after the principles of the present invention have been read and understood. Accordingly, the scope of the invention is not to be limited by the above-description, but only the scope of the claims which follow.

What is claimed is:

1. An elastomeric low pressure sensor comprising a pair of spaced apart and independent planar electrodes, a first one of said electrodes comprising a conductive elastomeric layer and the second electrode comprising a conductive layer supported on a rigid dielectric, said electrodes being arranged such that the rigid dielectric is located intermediate said conductive layers.

2. The sensor of claim 1 wherein said conductive elastomeric layer is supported on an elastomeric support layer.

3. The sensor of claim 2 wherein said elastomeric support layer comprises a silicone elastomer.

4. The sensor of claim 1 wherein said conductive elastomeric layer comprises a conductive material disposed in an elastomeric binder.

5. The sensor of claim 4 wherein said conductive material comprises carbon.

6. The sensor of claim 4 wherein said elastomeric binder comprises a silicone elastomer.

7. The sensor of claim 4 wherein said conductive material is in particulate form.

8. The sensor of claim 4 wherein said conductive material is present in an amount of about 5 to 50 percent by weight and said binder is present in an amount of about 50 to 95 percent by weight.

9. The sensor of claim 1 including first and second mounting plate means arranged to contain said electrodes, solid dielectric and fastening means for urging said plate means toward one another.

10. The sensor of claim 9 wherein said first and second mounting plates, said second electrode and rigid dielectric include aperture means for exposing said first electrode to a pressure differential.

11. The sensor of claim 9 wherein said mounting plates are made from a rigid electrically insulating material.

12. The sensor of claim 11 wherein said insulating material is selected from the group consisting of ceramic and plastic materials.

13. The sensor of claim 1 wherein said conductive elastomeric layer is strained.

14. The sensor of claim 13 wherein said conductive elastomeric layer is strained 8-14%.

15. The sensor of claim 1 wherein said conductive elastomeric layer is strained radially.

16. An elastomer low pressure sensor comprising:
   a lower mounting plate having upper and lower faces, a recess in said upper face and a rim extending upwardly from said upper face and surrounding said recess;
   an elastomeric electrode disposed over said rim, said elastomeric electrode comprising a lower elastomeric support layer and an upper elastomeric electrode layer;
   a solid electrode disposed over said elastomeric electrode, said solid electrode comprising a lower dielectric layer and an upper conductive layer, a generally annular conductive contact ring disposed on the lower surface of said solid dielectric layer;
   an upper mounting plate having upper and lower faces;
   an aperture through each of said mounting plates and said solid electrode; and
   fastener means for joining said mounting plates and sandwiching said electrodes therebetween.

17. The sensor of claim 16 wherein said elastomeric support layer is a silicone polymer and said elastomeric electrode layer comprises conductive particles disposed in a silicone elastomeric binder.

18. The sensor of claim 17 wherein said conductive particles comprise carbon.

19. The sensor of claim 16 wherein said elastomeric electrode composite is prestrained radially when said first and second mounting plates are joined to one another.

20. The sensor of claim 19 wherein said prestrain is from about 8-14%.

21. The sensor of claim 16 wherein said mounting plates are ceramic.

22. The sensor of claim 16 wherein wire leads are attached to said contact ring and to said solid upper conductive layer.

23. An elastomer low pressure sensor comprising:
   a lower mounting plate having a generally circular lower plate and a generally cylindrical portion extending axially therefrom and terminating in an upper face, a recess in said upper face and a rim extending upwardly from said upper face and surrounding said recess;
   a generally circular elastomeric electrode disposed over said rim, said elastomeric electrode comprising a lower elastomeric support layer and an upper elastomeric electrode layer, a peripheral ring being provided about said elastomeric electrode;
   a solid electrode disposed over said elastomeric electrode, said solid electrode comprising a lower dielectric layer and an upper conductive layer, a generally annular conductive contact ring disposed on the lower surface of said solid dielectric layer;
   an upper mounting plate having a generally circular upper plate and a generally cylindrical skirt depending from the periphery thereof;
   an aperture through each of said mounting plates and said solid electrode;
   means for holding said peripheral ring during assembly of said sensor; and
   fastener means for joining said mounting plates to sandwich said electrodes therebetween and radially prestrain said elastomeric electrode over said rim.

24. The sensor of claim 23 wherein said elastomeric support layer is a silicone polymer and said elastomeric electrode layer comprises conductive particles disposed in a silicone elastomeric binder.

25. The sensor of claim 24 wherein said conductive particles comprise carbon.

26. The sensor of claim 23 wherein said prestrain is from about 8-14%.

27. The sensor of claim 23 wherein a spacer ring is located between said solid electrode and said elastomeric electrode and a retaining means is employed as said holding means, said retaining means being located intermediate said elastomeric electrode and said lower mounting plate.

28. An elastomeric low pressure sensor comprising:
   a pair of spaced apart planar electrodes, a first one of said electrodes comprising a conductive elastomeric layer and the second electrode comprising a conductive layer support on a solid dielectric, said electrodes being arranged such that the solid dielectric is located intermediate said conductive layers, the sensor including first and second mounting plate means arranged to contain said electrodes and solid dielectric, and fastening means for urging said plate means toward one another, wherein a raised rim is provided on a face of one of said mounting plates and said conductive elastomeric layer is strained thereover during assembly of said sensor, said raised rim being adapted to prevent said strained elastomeric layer from slipping after assembly is completed.

29. The sensor of claim 28 wherein said conductive elastomeric layer is strained 8-14%.

* * * * *